United States Patent
Skog et al.

(10) Patent No.: US 9,538,405 B2
(45) Date of Patent: Jan. 3, 2017

(54) DEVICES, METHODS, AND COMPUTER PROGRAMS FOR DETECTING POTENTIAL DISPLACEMENT OF A WIRELESS TRANSCEIVER

(75) Inventors: Robert Skog, Hasselby (SE); Andreas Ljunggren, Vallingby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 35 days.

(21) Appl. No.: 14/000,015

(22) PCT Filed: Feb. 17, 2011

(86) PCT No.: PCT/SE2011/050177
§ 371 (c)(1),
(2), (4) Date: Aug. 16, 2013

(87) PCT Pub. No.: WO2012/112092
PCT Pub. Date: Aug. 23, 2012

(65) Prior Publication Data
US 2013/0316754 A1    Nov. 28, 2013

(51) Int. Cl.
*H04B 7/00*    (2006.01)
*H04W 24/08*    (2009.01)
(Continued)

(52) U.S. Cl.
CPC ............... *H04W 24/08* (2013.01); *G01S 5/02* (2013.01); *H04W 64/00* (2013.01)

(58) Field of Classification Search
CPC ...... H04W 64/00; H04W 4/028; H04W 4/043; H04W 4/02; H04W 84/18; H04W 16/14; H04W 28/04; H04W 56/0015; H04W 72/12; H04W 88/06; H04W 92/02; H04W 24/00; H04W 4/08; H04W 84/10; H04W 8/26; H04W 92/18; H04W 28/26; H04W 4/00; G01S 5/021; G01S 5/0252; G01S 5/0294; G01S 5/0027; G01S 5/0054; G01S 11/02; G01S 1/045; G01S 5/0009

See application file for complete search history.

(56) References Cited

U.S. PATENT DOCUMENTS

| | | | |
|---|---|---|---|
| 5,055,851 A | 10/1991 | Sheffer | |
| 2004/0157621 A1* | 8/2004 | Yamasaki | H04W 64/00 455/456.1 |

(Continued)

FOREIGN PATENT DOCUMENTS

| | | |
|---|---|---|
| CN | 101233543 A | 7/2008 |
| CN | 101867970 B | 10/2010 |

(Continued)

OTHER PUBLICATIONS

Office Action issued in corresponding Japanese Patent Application No. 2013-554417, on Aug. 18, 2014, 4 pages.

(Continued)

*Primary Examiner* — Golam Sorowar
(74) *Attorney, Agent, or Firm* — Rothwell, Figg, Ernst & Manbeck, p.c.

(57) ABSTRACT

It is presented a method for detecting potential displacement of a wireless transceiver connected to a machine-to-machine device. The method comprises the steps, executed in a displacement detection server, of: receiving an updated radio environment message from the wireless transceiver, the radio environment message comprising updated radio characteristics of at least two radio cells, the updated characteristics being measured by the wireless transceiver; determining whether the updated radio characteristics differ significantly from previous radio characteristics of a previous radio environment message from the wireless transceiver; and when it is determined that radio characteristics differ significantly, sending a displacement indication mes- (Continued)

sage to a device management server, the displacement indication message indicating potential displacement of the wireless transceiver. Corresponding displacement detection server, host device, computer program and computer program product are also presented.

24 Claims, 6 Drawing Sheets

(51) Int. Cl.
*H04W 64/00* (2009.01)
*G01S 5/02* (2010.01)

(56) References Cited

U.S. PATENT DOCUMENTS

| | | | |
|---|---|---|---|
| 2004/0166839 A1 | 8/2004 | Okkonen et al. | |
| 2004/0248589 A1* | 12/2004 | Gwon | G01S 5/0252 455/456.1 |
| 2005/0266855 A1 | 12/2005 | Zeng et al. | |
| 2006/0046723 A1 | 3/2006 | Liu | |
| 2006/0211376 A1* | 9/2006 | Bhattacharya et al. | 455/67.11 |
| 2007/0088974 A1 | 4/2007 | Chandwani et al. | |
| 2007/0176741 A1 | 8/2007 | Montenegro | |
| 2007/0287433 A1 | 12/2007 | Wollersheim et al. | |
| 2008/0130573 A1* | 6/2008 | Lee | H04W 16/10 370/331 |
| 2008/0194274 A1* | 8/2008 | Ko | H04W 68/10 455/456.3 |
| 2008/0207219 A1* | 8/2008 | Bhattacharya | H04W 64/00 455/456.1 |
| 2009/0131038 A1* | 5/2009 | MacNaughtan | H04W 24/02 455/422.1 |
| 2010/0057485 A1 | 3/2010 | Luft | |
| 2010/0081451 A1 | 4/2010 | Mueck et al. | |
| 2010/0135178 A1* | 6/2010 | Aggarwal | G01S 5/0205 370/252 |
| 2010/0173628 A1 | 7/2010 | Hosain et al. | |
| 2010/0202368 A1 | 8/2010 | Hans | |
| 2010/0227627 A1* | 9/2010 | Ishii et al. | 455/456.2 |
| 2010/0279697 A1* | 11/2010 | Yang et al. | 455/446 |
| 2010/0285816 A1* | 11/2010 | Vos et al. | 455/456.1 |
| 2011/0084881 A1* | 4/2011 | Fischer | G06F 17/30241 342/451 |
| 2011/0213871 A1* | 9/2011 | DiGirolamo | H04W 4/00 709/223 |
| 2012/0115510 A1 | 5/2012 | Denby et al. | |
| 2012/0142369 A1* | 6/2012 | Hodges | G01S 5/02 455/456.1 |

FOREIGN PATENT DOCUMENTS

| | | |
|---|---|---|
| JP | H1084570 A | 3/1998 |
| JP | 2005167321 A | 6/2005 |
| WO | 2005020497 A2 | 3/2005 |
| WO | 2007025151 A2 | 3/2007 |
| WO | 2009032788 A1 | 3/2009 |
| WO | 2009/092115 A2 | 7/2009 |
| WO | 2010/054472 A1 | 5/2010 |
| WO | 2010142615 A1 | 12/2010 |

OTHER PUBLICATIONS

First Office Action issued on Apr. 21, 2016 in corresponding Chinese Application No. 201180067790.X, 14 pages (English translation).
3GPP TS 22.368 V11.0.1 "3rd Generation Partnership Project; Technical Specification Group Services and System Aspects;Service requirements for Machine-Type Communications (MTC); Stage 1 (Release 11)," Feb. 2011, 23 pages.
Telecom Italia, "Theft Vulnerable MTC," 3GPP TSG-SA1 #44, S1-090224, San Antonio, Texas, USA, Feb. 2-6, 2009, 3 pages.
Supplementary European Search Report issued in corresponding application No. 11 85 8645 dated Aug. 4, 2016, 3 pages.

* cited by examiner

DEVICES, METHODS, AND COMPUTER PROGRAMS FOR DETECTING POTENTIAL DISPLACEMENT OF A WIRELESS TRANSCEIVER

CROSS REFERENCE TO RELATED APPLICATION(S)

This application is a 35 U.S.C.§371 National Phase Entry Application from PCT/SE2011/050177, filed Feb. 17, 2011, the disclosure of which is incorporated herein in its entirety by reference.

TECHNICAL FIELD

The invention relates to machine-to-machine solutions and in particular to detection of potential displacement in machine-to-machine solutions.

BACKGROUND

Machine-to-machine (M2M) solutions are increasing in popularity. M2M can for example be used to collect data from M2M devices in various locations to an M2M application running centrally. For example, a sensor, such as an electricity meter, thermometer, or drink machine stock sensor can be used to collect data from M2M devices to an M2M application.

M2M devices communicate with an M2M core network using a wireless transceiver. The wireless transceiver can be included in the M2M device itself, or in an M2M gateway, which serves as wireless communication means for one or more M2M devices.

With M2M devices increasing in numbers, there will be a greater risk of such devices being tampered with or even stolen.

WO 2009/092115 discloses a method and apparatus for performing secure Machine-to-Machine (M2M) provisioning and communication. It is disclosed various events to detect tampering of M2M enabled equipment (M2ME). These events include (1) remediable and/or un-remediable compromise of the OS by malware or viruses; (2) buffer overflow events; (3) sudden unexpected or unauthorized changes in radio or higher-layer connectivity characteristics and/or environmental readings; (4) excessively repeated failure and/or denial of access or service by trusted network elements for the M2ME's requests for preliminary authentication, registration, or MID provisioning; or (5) any unexpected/unauthorized change in a post-boot or run-time reading of 'trust state' of the M2ME 110 or M2ME subsystem relating to remote MID (manageable identities) management functionality. However, it is not disclosed how to detect stolen or misplaced M2M devices.

It is thus desired to provide a way to not only detect physical displacement of transceivers in an M2M system, but also provide such detection in an efficient way, especially for M2M systems with a vast number of M2M devices.

SUMMARY

An object of the invention is to provide a more efficient way to filter transceivers that appear to be displaced.

In a first embodiment, it is presented a displacement detection server for detecting potential displacement of a wireless transceiver connected to a machine-to-machine device. The displacement detection server comprises: a message receiver arranged to receive an updated radio environment message from the wireless transceiver, the radio environment message comprising updated radio characteristics of at least two radio cells, the updated characteristics being measured by the wireless transceiver; a determiner arranged to determine whether the updated radio characteristics differ significantly from previous radio characteristics of a previous radio environment message from the wireless transceiver; and a message transmitter arranged to, when it is determined that radio characteristics differ significantly, send a displacement indication message to a device management server, the displacement indication message indicating potential displacement of the wireless transceiver.

By measuring radio characteristics of several cells, accuracy is improved, e.g. compared to only detecting the attached cell or base station. By detecting changes in the radio characteristics, potential displacement is detected. This can serve as a first filter, where the device management server can perform further action only when potential displacement is detected. Consequently, the demands on the device management server is reduced compared to if the device management server would need to periodically check all devices.

The radio environment message may comprise radio characteristics of all radio cells available to the wireless transceiver. By measuring radio characteristics of all cells, even small displacements can potentially be detected.

The radio environment message may comprise measurements of signal strength of the radio cells. By a numerical value such as signal strength, a smaller granularity is achieved, leading to greater accuracy.

The determiner may further be arranged to determine that the updated radio characteristics differ significantly from previous radio characteristics of a previous radio environment message from the wireless transceiver when a difference is persistent, as defined by radio characteristics differing from previous radio characteristics during a predetermined number of radio environment messages. This reduces the risk of false positives, e.g. due to a person or a car being in the vicinity of the transceiver.

The message receiver may be further arranged to receive the updated radio environment message as an initiative from the wireless transceiver.

The message transmitter may be further arranged to send a request message to the wireless transceiver, requesting the wireless transceiver to send the updated radio environment message.

The determiner may be arranged to determine whether the updated radio characteristics differ significantly using a calculation of a difference using root mean square.

In a second embodiment, it is presented a method for detecting potential displacement of a wireless transceiver connected to a machine-to-machine device. The method comprises the steps, executed in a displacement detection server, of: receiving an updated radio environment message from the wireless transceiver, the radio environment message comprising updated radio characteristics of at least two radio cells, the updated characteristics being measured by the wireless transceiver; determining whether the updated radio characteristics differ significantly from previous radio characteristics of a previous radio environment message from the wireless transceiver; and when it is determined that radio characteristics differ significantly, sending a displacement indication message to a device management server, the displacement indication message indicating potential displacement of the wireless transceiver.

The radio environment message may comprise radio characteristics of all radio cells available to the wireless transceiver.

The radio environment message may comprise measurements of signal strength of the radio cells.

The step of determining may involve determining that the updated radio characteristics differ significantly from previous radio characteristics of a previous radio environment message from the wireless transceiver when a difference is persistent, as defined by radio characteristics differing from previous radio characteristics during a predetermined number of radio environment messages.

The step of receiving may receive the updated radio environment message as an initiative from the wireless transceiver.

The method may further comprise the step, prior to the step of receiving an updated radio environment message, of: sending a request message to the wireless transceiver, requesting the wireless transceiver to send the updated radio environment message.

The step of determining may involve calculating a difference using root mean square.

A third embodiment is a computer program for detecting potential displacement of a wireless transceiver connected to a machine-to-machine device, the computer program comprising computer program code which, when run on a displacement detection server, causes the displacement detection server to: receive an updated radio environment message from the wireless transceiver, the radio environment message comprising updated radio characteristics of at least two radio cells, the updated characteristics being measured by the wireless transceiver; determine whether the updated radio characteristics differ significantly from previous radio characteristics of a previous radio environment message from the wireless transceiver; and when it is determined that radio characteristics differ significantly, send a displacement indication message to a device management server, the displacement indication message indicating potential displacement of the wireless transceiver.

A fourth embodiment is a computer program product comprising a computer program according to the third embodiment and a computer readable means on which the computer program is stored.

A fifth embodiment is a host device for detecting potential displacement of a wireless transceiver connected to a machine-to-machine device. The host device comprises: the wireless transceiver; a measurer arranged to measure updated radio characteristics of at least two radio cells; a determiner arranged to determine whether the updated radio characteristics differ significantly from previous radio characteristics of a previous measurement; and a transmitter arranged to, when it is determined that radio characteristics differ significantly, send a displacement indication message to a displacement detection server, the displacement indication message indicating potential displacement of the wireless transceiver.

The host device may be the machine-to-machine device.

The host device may be a machine-to-machine gateway, the machine-to-machine gateway being distinct from the machine-to-machine device.

The measurer may be arranged to measure radio characteristics of all radio cells available to the wireless transceiver.

The measurer may be arranged to measure signal strength of the radio cells.

The determiner may be arranged to determine that the updated radio characteristics differ significantly from previous radio characteristics when a difference is persistent, as defined by radio characteristics differing from previous radio characteristics during a predetermined number of radio environment messages.

The determiner may be arranged to determine whether the updated radio characteristics differ significantly using a calculation of a difference using root mean square.

The measurer may be arranged to measure radio cells of at least two separate mobile communication networks operated by two separate mobile network operators.

A sixth embodiment is a method for detecting potential displacement of a wireless transceiver connected to a machine-to-machine device. The method comprises the steps, executed in a host device comprising the wireless transceiver, of: measuring updated radio characteristics of at least two radio cells; determining whether the updated radio characteristics differ significantly from previous radio characteristics of a previous measurement; and when it is determined that radio characteristics differ significantly, sending a displacement indication message to a displacement detection server, the displacement indication message indicating potential displacement of the wireless transceiver.

The step of measuring may comprise measuring radio characteristics of all radio cells available to the wireless transceiver.

The step of measuring may comprise measuring signal strength of the radio cells.

The step of determining may involve determining that the updated radio characteristics differ significantly from previous radio characteristics when a difference is persistent, as defined by radio characteristics differing from previous radio characteristics during a predetermined number of radio environment messages.

The step of determining may involve the calculating a difference using root mean square.

The step of measuring updated radio characteristics may involve measuring radio cells of at least two separate mobile communication networks operated by two separate mobile network operators.

A seventh embodiment is a computer program for detecting potential displacement of a wireless transceiver connected to a machine-to-machine device, the computer program comprising computer program code which, when run on a host device, causes the host device to: measure updated radio characteristics of at least two radio cells; determine whether the updated radio characteristics differ significantly from previous radio characteristics of a previous measurement; and when it is determined that radio characteristics differ significantly, send a displacement indication message to a displacement detection server, the displacement indication message indicating potential displacement of the wireless transceiver.

An eighth embodiment is a computer program product comprising a computer program according to the seventh embodiment and a computer readable means on which the computer program is stored.

It is to be noted that any feature of the first, second, third, fourth, fifth, sixth, seventh and eighth embodiments may, where appropriate, be applied to any other of these embodiments.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
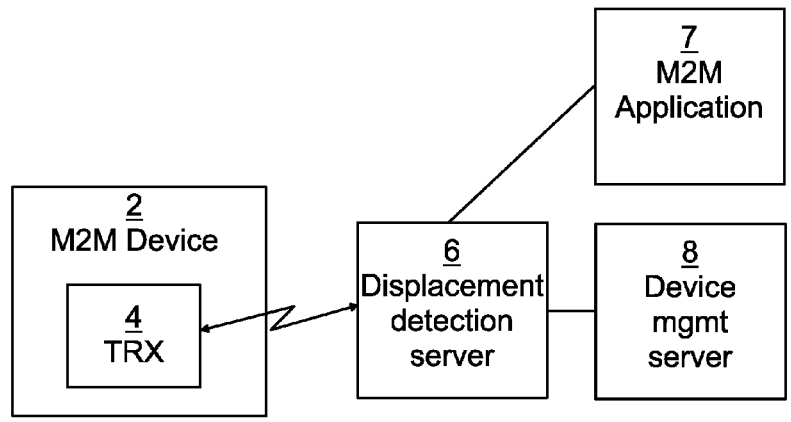
FIGS. 1A and 1B are schematic diagrams illustrating a machine-to-machine environment where embodiments disclosed herein can be applied.
Figure 1B:
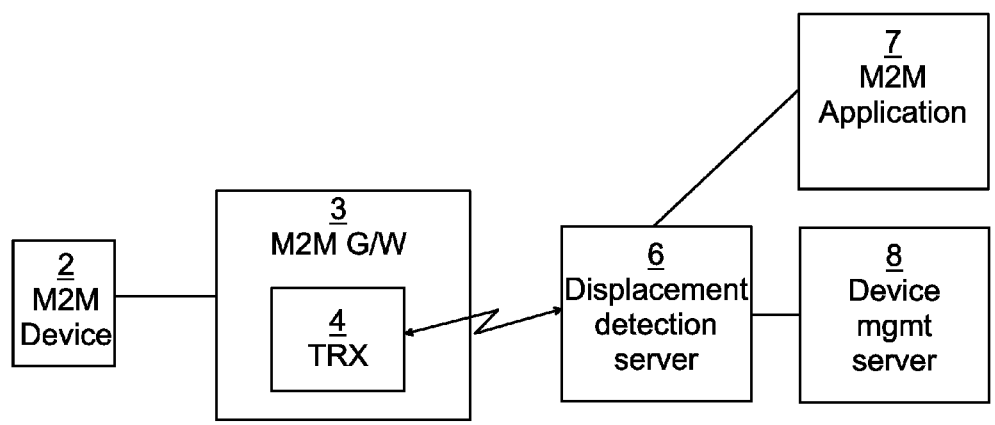

FIGS. 1A and 1B are schematic diagrams illustrating an M2M environment where embodiments disclosed herein can be applied. In FIG. 1a, an M2M device 2 comprises a wireless transceiver 4 which can communicate wirelessly with a displacement detection server 6. The wireless transceiver 4 could optionally be divided into separate transmitter and receiver parts. The wireless connection between the wireless transceiver 4 and the displacement detection server 6 can for example be implemented using a mobile communication network according to e.g. UMTS (Universal Mobile Telecommunications System), GSM (Global System for Mobile Communication), LTE (Long Term Evolution), CDMA (Code Division Multiple Access)-2000, etc.

The displacement detection server 6 is in turn connected to a device management server 8, e.g. via an internet protocol (IP) connection such as a local area network or the Internet. Optionally, the displacement detection server 6 and the device management server 8 can be contained in a single piece of hardware.

The displacement detection server 6 can be part of a set of one or more M2M core devices. An M2M application 7 can in this way receive and/or send data from/to the M2M device 2.

Moreover, the displacement detection server 6, as is explained in more detail below, receives data from the wireless transceiver 4, and when it is suspected that the wireless transceiver 4 has been replaced, notifies the device management server 8 for further action.

In FIG. 1a, the wireless transceiver 4 is comprised in the M2M device 2, while in FIG. 1B, the wireless transceiver 4 is comprised in an M2M gateway 3. The M2M gateway serves as wireless communication means for one or more M2M devices 2.

Figure 2A:
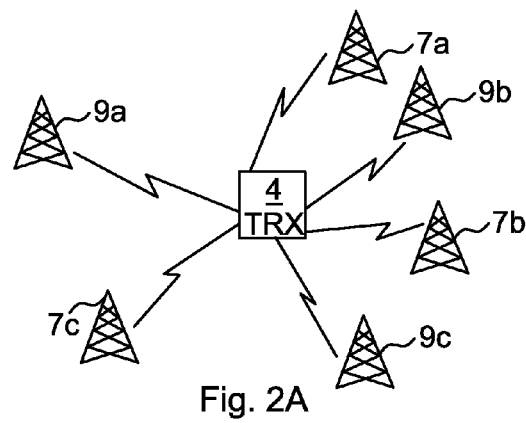
FIGS. 2A-2C are schematic diagrams illustrating the radio environment of the wireless transceiver 4 of FIGS. 1A-1B, FIGS. 3A-3B are flow charts illustrating two embodiments of a method executed in the displacement detection server of FIGS. 1A-1B.
Figure 2B:
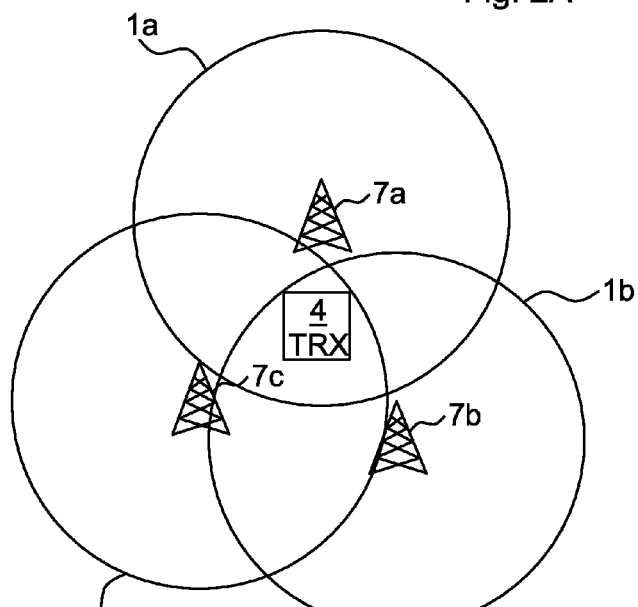
Figure 2C:
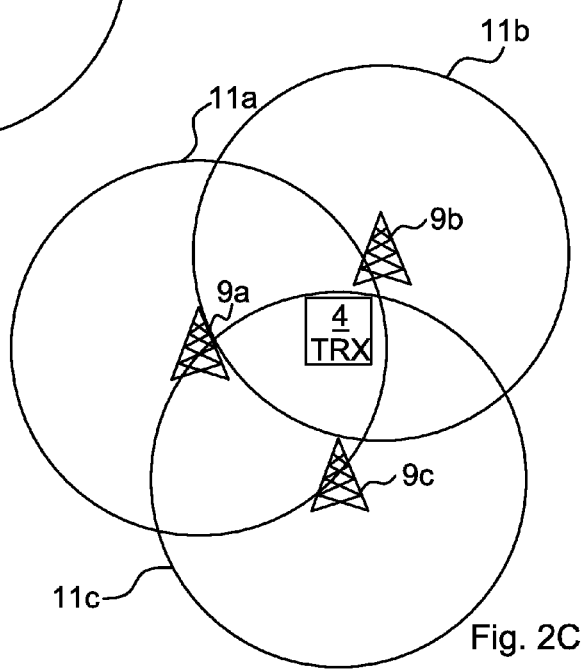

FIGS. 2A-2C are schematic diagrams illustrating the radio environment of the wireless transceiver 4 of FIGS. 1A-1B. In FIG. 2A, it is shown all base stations 7a-7c, 9a-9c that the wireless transceiver 4 can detect.

FIG. 2B shows the base stations 7a-7c belonging to a first mobile communication network to which the wireless transceiver 4 is a subscriber. Each base station 7a-7c is responsible for a respective cell 1a-c. Although not shown here, each base station can also be responsible for more than one cell. To more clearly illustrate the first mobile communication network, FIG. 2B omits any base stations not part of the first mobile communication network.

FIG. 2C shows the base stations 9a-9c belonging to second mobile communication network with which the wireless transceiver 4 is not a subscriber. Each base station 9a-9c is responsible for a respective cell 11a-c. Although not shown here, each base station can also be responsible for more than one cell. To more clearly illustrate the second mobile communication network, FIG. 2B omits any base stations not part of the second mobile communication network.

Returning to FIG. 2A, it is here clear that although the wireless transceiver 4 is part of the first mobile communication network, the wireless transceiver 4 can detect base station of all mobile communication networks that are within range.

The wireless transceiver 4 can thus measure radio characteristics based on the cells of the surrounding base stations 7a-c, 9a-c. For example the radio characteristics can be measured as all signal-to-noise ratios for the respective cells of the base stations 7a-c, 9a-c and/or all signal strengths for the cells of the base stations 7a-c, 9a-c. If the wireless transceiver 4 is displaced, the radio characteristics would change since the radio environment changes with a displacement, e.g. due to different distance to base stations, changed interference of intermediate objects, etc. Since there are more than one, and optionally all, cells that are considered for the radio characteristics, the radio characteristic changes even with a small displacement of the wireless transceiver 4. This provides great accuracy compared to e.g. if only radio characteristics of one cell were to be considered.

One example of how radio characteristics are obtained will now be explained. Signal strengths (or signal to noise ratios) of detectable cells are first obtained. In a numeric example to illustrate the scheme, signal strengths (on a scale from 0 to 1): for four exemplifying cells are: A: 0.4, B: 0.7, C. 0.2, D: 0.9. The signal strengths of the cells are arranged in order, e.g. in a decremental order, yielding the combination in the example of: 0.9, 0.7, 0.4, 0.2. Optionally, weights can then be applied such that the strongest cell is assigned the largest weight. For example, weights could be 1, 0.7, 0.5, 0.3, 0.1, 0.1, etc. Any other set of weights could be used as long as each subsequent weight is less than or equal to the previous one. The weights are then respectively multiplied for all the signal strength, which in this example would result in a set: 0.9*1, 0.7*0.5, 0.4*0.3, 0.2*0.1. The terms can then be combined, e.g. by adding them together to get a numeric value of the radio characteristics. In this example, the value would be calculated as 0.9*1+0.7*0.5+0.4*0.3+0.2*0.1=1.39. This numeric value can then be compared over time to detect any changes, optionally with a threshold difference to be considered a change. Optionally, any anomalies need to persist for more than a pre-determined number of measurements to be considered a change of radio characteristics.

If weights are used, changes in signal strength for cells that are closer to the wireless transceiver 4 have greater impact.

Figure 3A:
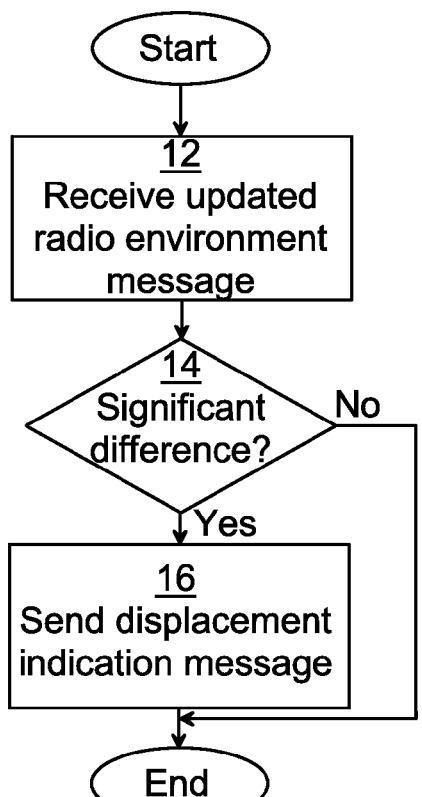
Figure 3B:
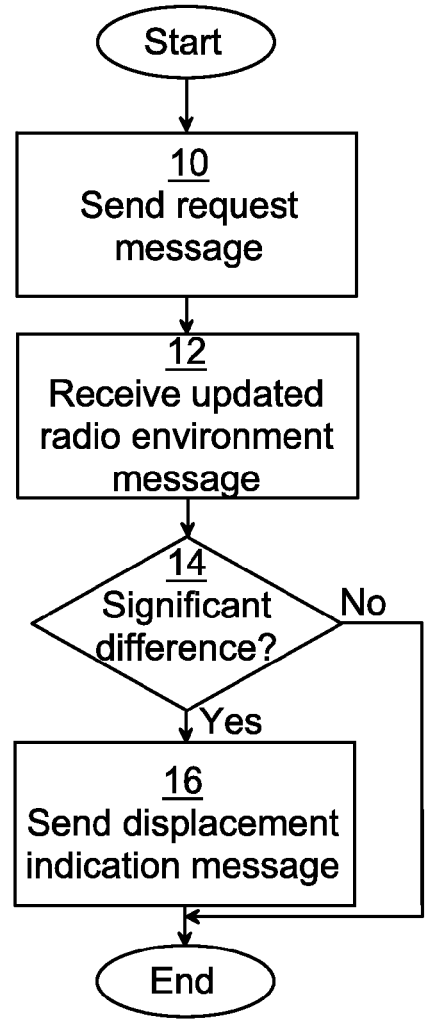

FIGS. 3A-3B are flow charts illustrating two embodiments of a method executed in the displacement detection server 6 of FIGS. 1A-1B. It is to be noted that the illustrated methods can occur in relation to one or more transceivers 4 simultaneously.

In an initial step 12 to receive updated radio environment message, an updated radio environment message is received from the wireless transceiver 4. The radio environment message comprises updated radio characteristics of at least two radio cells, as measured by the wireless transceiver 4. Updated in this context means the most recent.

In a conditional significant difference step 14, it is determined whether the updated radio characteristics differ significantly from previous radio characteristics of a previous radio environment message from the wireless transceiver 4. A significant difference is an indication that the wireless transceiver 4 has moved. The comparison can e.g. compare the updated radio characteristics with the most recently previously received radio characteristics or an average of the last few received radio characteristics. If there is a significant difference, the method continues to a step 16 to send displacement indication message. Otherwise, the method ends.

In the step 16 to send displacement indication message, a displacement indication message is sent to the device management server 8. The displacement indication message thus indicates potential displacement of the wireless transceiver 4, which is a signal that the device management server 8 can act further upon.

In FIG. 3A, the method starts when the updated radio environment message is received.

In FIG. 3B, there is a step prior to the step 12 to receive updated radio environment message, which is a step send request message step 10. In the send request message step 10, a request message is sent to the wireless transceiver 4, requesting the wireless transceiver to send the updated radio environment message 32. The remaining steps of FIG. 3B are identical to those of FIG. 3A.

Hence, FIG. 3B illustrates a method where polling is used to obtain the updated radio environment message, while FIG. 3A illustrates a wireless transceiver originated mechanism for sending the updated radio environment message.

Figure 4:
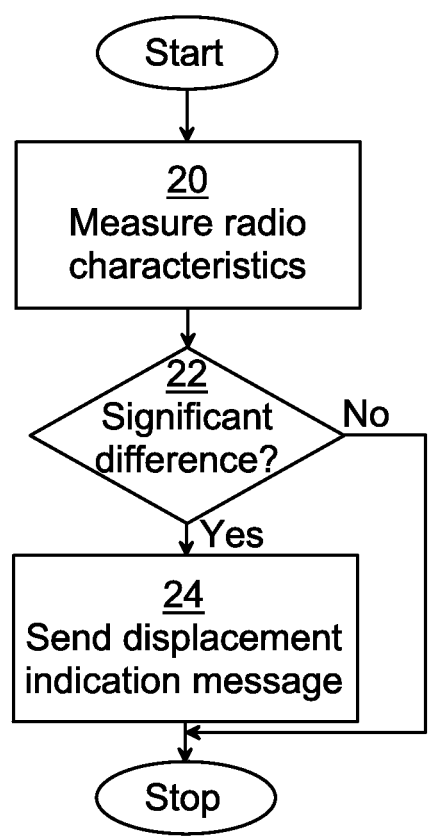
FIG. 4 is a flow chart illustrating an embodiment of a method executed in a host device.

FIG. 4 is a flow chart illustrating an embodiment of a method executed in a host device comprising the transceiver. The host device can be the M2M device 2 as illustrated in FIG. 1A or the M2M gateway as illustrated in FIG. 1B.

In an initial measure radio characteristics step 20, updated radio characteristics of at least two radio cells are measured, as described in with reference to FIGS. 2A-B above.

In a conditional significant difference step 22, it is determined whether the updated radio characteristics differ significantly from previous radio characteristics of a previous measurement. The comparison can e.g. compare the updated radio characteristics with the most recently previously received radio characteristics or an average of the last few received radio characteristics. The difference can e.g. be calculated using a Root Mean Square (RMS) calculation of the various measurements. If there is a significant difference, the method continues to a step 24 to send displacement indication message. Otherwise, the method ends.

In the step 24 to send displacement indication message, a displacement indication message is sent to the displacement detection server 6. The displacement indication message thus indicates potential displacement of the wireless transceiver 4, which is a signal that the displacement detection server 6 can act further upon.

Figure 5A:
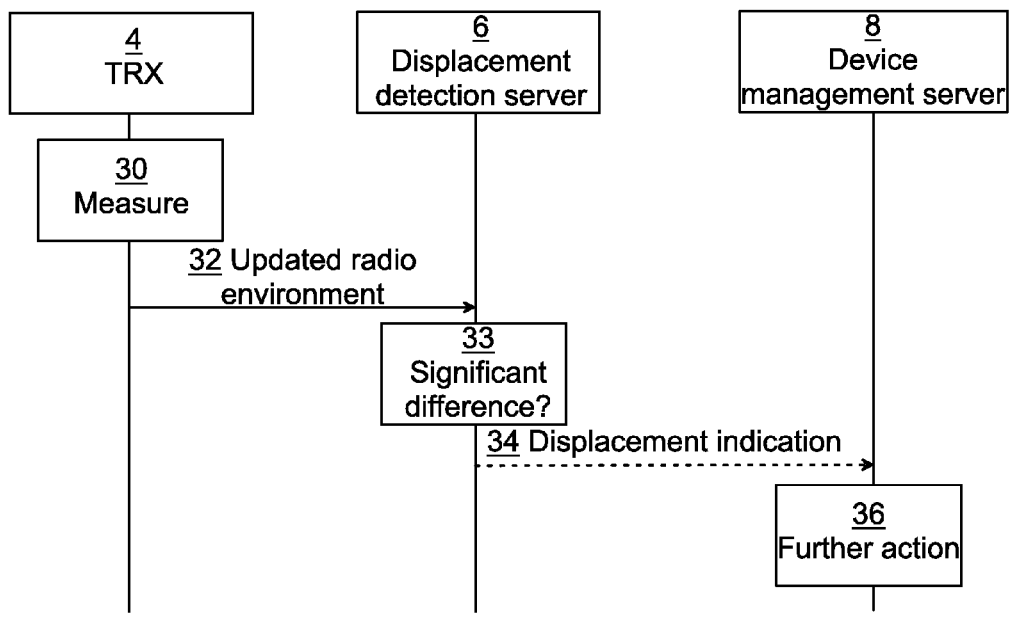
FIG. 5A is a sequence diagram illustrating communication corresponding to the method of FIGS. 3A-3B.

FIG. 5A is a sequence diagram illustrating communication corresponding to the method of FIGS. 3A-3B. Here the transceiver 4 first measures 30 the radio environment comprising current radio characteristics to be considered to be updated radio characteristics.

The transceiver then sends an updated radio environment message 32 comprising the updated radio characteristics to the displacement detection server 6. The displacement detection server determines whether there is a significant difference 33 in the updated radio characteristics compared to previous radio characteristics. If there is a significant difference, the displacement detection server sends a displacement indication message 34 to the device management server 8.

The device management server 8 can then perform further action 36 with more demanding processing to determine more accurately whether the transceiver 4 has been displaced. For example, the device management server 8 could obtain its position using GPS (Global Positioning System), triangulation or similar.

It is thus illustrated how, by analysing radio characteristics over time, the displacement detection server 6 can detect potential displacement and communicate such risky situations to the device management server 8. This alleviates the device management from continuously having to query about GPS positions or similar, which consumes a considerable amount of resources. This is particularly advantageous when the number of transceivers 4 is very large, whereby the displacement detection server only notifies the device management server 8 when there is a potential displacement. Hence, even if the displacement detection presented is not completely accurate in indicating true displacement and may give some false indications of displacement, this structure offloads the device management server from not having to continuously manage location of all transceivers 4.

Figure 5B:
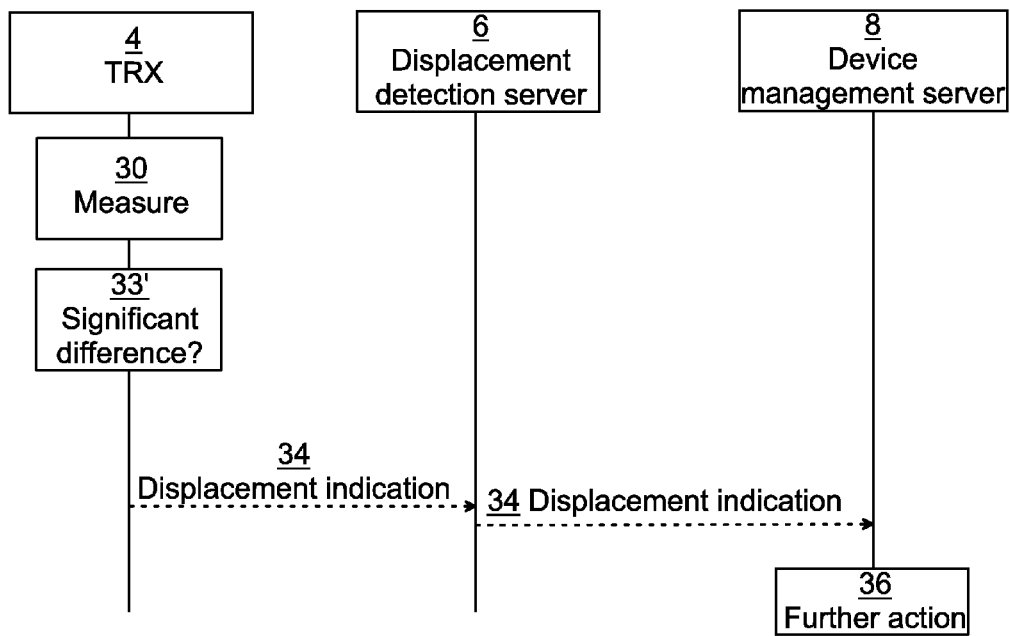
FIG. 5B is a sequence diagram illustrating communication corresponding to the method of FIG. 4, FIG. 6A schematically shows some components of the displacement detection server of FIGS. 1A-1B.

FIG. 5B is a sequence diagram illustrating communication corresponding to the method of FIG. 4.

Here the transceiver 4 first measures 30 the radio environment comprising current radio characteristics to be considered to be updated radio characteristics.

The transceiver 4 determines whether there is a significant difference 33' in the updated radio characteristics compared to previous radio characteristics. If there is a significant difference, the transceiver 4 sends a displacement indication message 34 to the displacement detection server 6, which in turn sends a corresponding displacement indication message 34 to the device management server 8.

As explained above, the device management server 8 can then perform more demanding processing to determine more accurately whether the transceiver 4 has been displaced. For example, the device management server 8 could query the transceiver to obtain its position using GPS (Global Positioning System) or similar.

In the embodiment illustrated in FIG. 5B, processing is distributed even further, and the determination of whether there is a significant difference is performed in the transceiver 4. This offloads the core of the M2M system even more, which can be a significant advantage when the number of transceivers is great.

Figure 6A:
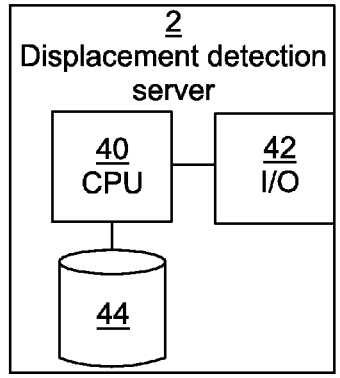
FIG. 6B is a schematic diagram showing functional modules of the displacement detection server of FIGS. 1A-1B, FIG. 7A schematically shows some components of a host device housing the wireless transceiver of FIGS. 1A-1B.

FIG. 6A schematically shows some components of the displacement detection server 2 of FIGS. 1A-1B.

The displacement detection server 2 can be any suitable computer capable of performing the tasks as described herein. For example, the displacement detection server 2 can be a computer running an operating system such as Linux, Microsoft Windows, Apple Mac OS X, UNIX variants, etc.

A controller 40 is provided using any suitable central processing unit (CPU), microcontroller, digital signal processor (DSP), etc., capable of executing software instructions stored in a computer program product 44, e.g. in the form of a memory. The computer program product 44 can be a memory or any combination of read and write memory (RAM) and read only memory (ROM). The memory also comprises persistent storage, which, for example, can be any single one or combination of magnetic memory, optical memory, or solid state memory or even remotely mounted memory.

The displacement detection server 2 also comprises an I/O interface 42, thereby providing connectivity to the transceiver 4 and the device management server 8.

Figure 6B:
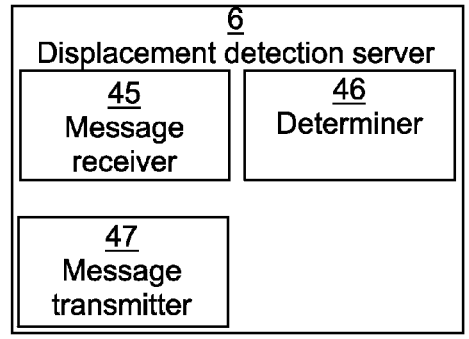

FIG. 6B is a schematic diagram showing functional modules of the displacement detection server 6 of FIGS. 1A-1B. The modules can be implemented using hardware and/or software such as a computer program executing in the displacement detection server 6. All modules depend on an execution environment (not shown) which utilises the controller 40, the computer program product 44 and the I/O interface 42. The modules correspond to steps of the method illustrated in FIGS. 3A and 3B.

A message receiver 45 is arranged to receive an updated radio environment message from the wireless transceiver 4.

A determiner 46 is arranged to determine whether the updated radio characteristics differ significantly from previous radio characteristics of a previous radio environment message from the wireless transceiver 4.

A message transmitter 47 is arranged to, when it is determined that radio characteristics differ significantly, send a displacement indication message to the device management server 8, where the displacement indication message indicates potential displacement of the wireless transceiver 4.

Figure 7A:
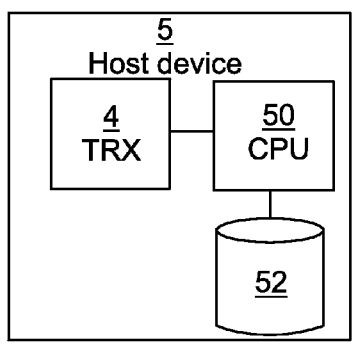
FIG. 7B is a schematic diagram showing functional modules of the host device FIG. 7A.

FIG. 7A schematically shows some components of a host device housing the wireless transceiver of FIGS. 1A-1B. As explained above, the host device is a device which houses the wireless transceiver 4. Hence, the host device 5 can be the M2M device 2 as illustrated in FIG. 1A or the M2M gateway as illustrated in FIG. 1B.

A controller 50 is provided using any suitable central processing unit (CPU), microcontroller, digital signal processor (DSP), etc., capable of executing software instructions stored in a computer program product 52, e.g. in the form of a memory. The computer program product 52 can be a memory or any combination of read and write memory (RAM) and read only memory (ROM). The memory also comprises persistent storage, which, for example, can be any single one or combination of magnetic memory, optical memory, or solid state memory or even remotely mounted memory.

The host device 5 also comprises the transceiver 4 thereby providing connectivity to the displacement detection server 2, and also to measure radio characteristics as detected by the host device 5.

Figure 7B:
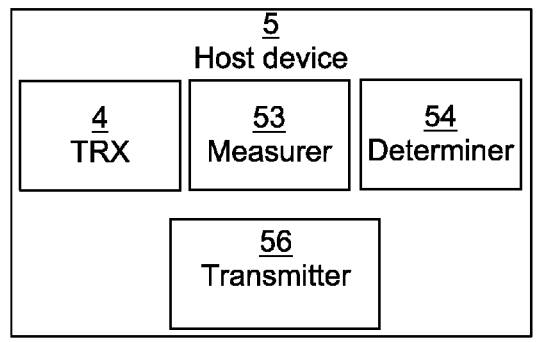

FIG. 7B is a schematic diagram showing functional modules of the host device FIG. 7A. The modules can be implemented using hardware and/or software such as a computer program executing in the host device 5. All modules depend on an execution environment (not shown) which utilises the controller 50, the computer program product 52 and the transceiver 4. The modules correspond to steps of the method illustrated in FIG. 4.

A measurer 53 is arranged to measure updated radio characteristics of at least two radio cells, e.g. using the transceiver 4.

A determiner 54 is arranged to determine whether the updated radio characteristics differ significantly from previous radio characteristics of a previous measurement.

A transmitter 56 is arranged to, when it is determined that radio characteristics differ significantly, send a displacement indication message to the displacement detection server 6, the displacement indication message indicating potential displacement of the wireless transceiver 4, and thus the host device.

Figure 8:
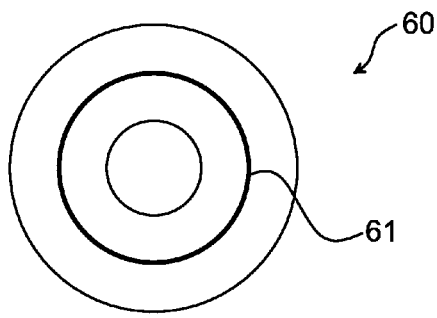
FIG. 8 shows one example of a computer program product comprising computer readable means.

FIG. 8 shows one example of a computer program product 60 comprising computer readable means. On this computer readable means a computer program 61 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 44 of the displacement detection server 2 or memory 52 of the host device 5. While the computer program 61 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A displacement detection server for detecting potential displacement of a wireless transceiver connected to a machine-to-machine device, the displacement detection server comprising:
    a receiver hardware apparatus for receiving an updated radio environment message, the updated radio environment message comprising information identifying updated radio characteristics of at least two radio cells, the updated characteristics being measured by the wireless transceiver;
    a processor configured to determine whether the updated radio characteristics of said at least two radio cells differ more than a certain predetermined amount from previous radio characteristics of a previous radio environment message from the wireless transceiver; and
    a transmitter hardware apparatus, wherein
    the displacement detection server is arranged to use the transmitter to send a displacement indication message to a device management server as a result of the processor determining that the updated radio characteristics differ more than the certain predetermined amount from the previous radio characteristics, the displacement indication message indicating potential displacement of the wireless transceiver, the displacement detection server is located remotely from the wireless transceiver, the information identifying updated radio characteristics of the at least two radio cells comprises a first set of received signal strength values, said first set of received signal strength values comprising a first received signal strength value based on a measured strength of a signal from a first cell and a second received signal strength value based on a measured strength of a signal from a second cell, the previous radio characteristics of said previous radio environment message comprises a second set of received signal strength values, said second set of received signal strength values comprising a third received signal strength value based on a measured strength of a signal from the first cell and a fourth received signal strength value based on a measured strength of a signal from the second cell, and the processor is configured to determine whether the updated radio characteristics of said at least two radio cells differ more than the certain predetermined amount from the previous radio characteristics of the previous radio environment message by determining whether the first set of received signal strength values differs more than the certain predetermined amount from the second set of received signal strength values.

2. The displacement detection server of claim 1, wherein the processor is configured to determine whether the updated radio characteristics differ more than the certain predetermined amount from the previous radio characteristics by: i) generating a first numeric value using the first and second received signal strength values, and ii) determining whether the first numeric value differs more than the certain predetermined amount than a previously generated numeric value that was previously generated using information from the previous radio environment message.

3. The displacement detection server of claim 2, wherein generating the first numeric value comprises forming an ordered set of received signal strength values, said ordered set comprising the first and second received signal strength value.

4. The displacement detection server of claim 2, wherein generating the first numeric value comprises calculating a numerical value using the first and second received signal strength values.

5. The displacement detection server of claim 4, wherein calculating the numerical value using the first and second received signal strength values comprises multiplying the first received signal strength value by a first weight value and multiplying the second received signal strength value by a second weight value.

6. A method for detecting potential displacement of a wireless transceiver connected to a machine-to-machine device, the method comprising the steps, executed in a displacement detection server, of:

receiving, at the displacement detection server, an updated radio environment message from the wireless transceiver, the updated radio environment message comprising information identifying updated radio characteristics of at least two radio cells, the updated characteristics being measured by the wireless transceiver;

determining, by the displacement detection server, whether the updated radio characteristics differ more than a certain predetermined amount from previous radio characteristics of a previous radio environment message from the wireless transceiver; and as a result of determining that radio characteristics differ more than the certain predetermined amount, the displacement detection server sending a displacement indication message to a device management server, the displacement indication message indicating potential displacement of the wireless transceiver, wherein the displacement detection server is located remotely from the wireless transceiver, the information identifying updated radio characteristics of the at least two radio cells comprises a first set of received signal strength values, said first set of received signal strength values comprising a first received signal strength value based on a measured strength of a signal from a first cell and a second received signal strength value based on a measured strength of a signal from a second cell, the previous radio characteristics of said previous radio environment message comprises a second set of received signal strength values, said second set of received signal strength values comprising a third received signal strength value based on a measured strength of a signal from the first cell and a fourth received signal strength value based on a measured strength of a signal from the second cell, and the step of determining whether the updated radio characteristics differ more than the certain predetermined amount from the previous radio characteristics comprises determining whether the first set of received signal strength values differs more than the certain predetermined amount from the second set of received signal strength values.

7. The method according to claim 6, wherein the updated radio environment message comprises radio characteristics of all radio cells available to the wireless transceiver.

8. The method according to claim 6, wherein the updated radio environment message comprises measurements of signal strength of all radio cells available to the wireless transceiver.

9. The method according to claim 6, wherein the step of determining involves determining that the updated radio characteristics differ more than the certain predetermined amount from previous radio characteristics of a previous radio environment message from the wireless transceiver when a difference is persistent, as defined by radio characteristics differing from previous radio characteristics during a predetermined number of radio environment messages.

10. The method according to claim 6, wherein the step of receiving receives the updated radio environment message as an initiative from the wireless transceiver.

11. The method according to claim 6, further comprising the step of sending to the wireless transceiver a request message requesting the wireless transceiver to send the updated radio environment message, wherein the sending step is performed prior to the step of receiving the updated radio environment message.

12. The method according to claim 6, wherein the step of determining involves calculating a difference using root mean square.

13. A computer program product comprising a non-transitory computer readable medium storing a computer program for detecting potential displacement of a wireless transceiver connected to a machine-to-machine device, the computer program comprising computer program code which, when run on a displacement detection server located remotely from the wireless transceiver, causes the displacement detection server to:
determine, in response to receiving from the wireless transceiver an updated radio environment message comprising information identifying updated radio characteristics of at least two radio cells measured by the wireless transceiver, whether the updated radio characteristics differ more than a certain predetermined amount from previous radio characteristics of a previous radio environment message from the wireless transceiver; and
as a result of determining that radio characteristics differ more than the certain predetermined amount, send a displacement indication message to a device management server, the displacement indication message indicating potential displacement of the wireless transceiver, wherein
the information identifying the updated radio characteristics of the at least two radio cells comprises a first set of received signal strength values, said first set of received signal strength values comprising a first received signal strength value based on a measured strength of a signal from a first cell and a second received signal strength value based on a measured strength of a signal from a second cell,
the previous radio characteristics of said previous radio environment message comprises a second set of received signal strength values, said second set of received signal strength values comprising a third received signal strength value based on a measured strength of a signal from the first cell and a fourth received signal strength value based on a measured strength of a signal from the second cell, and
the computer program is configured to cause the displacement server to determine whether the updated radio characteristics of said at least two radio cells differ more than the certain predetermined amount from the previous radio characteristics of the previous radio environment message by determining whether the first set of received signal strength values differs more than the certain predetermined amount from the second set of received signal strength values.

14. A host device for detecting potential displacement of a wireless transceiver connected to a machine-to-machine device, the host device comprising:
the wireless transceiver; and
a processor arranged to:
at a first point in time, measure a received signal strength of a first signal for a first cell to produce a first received signal strength value, measure a received signal strength of a second signal for a second cell to produce a second received signal strength value, form a first set of numeric values using the first and second received signal strength values,
at a second point in time, measure a received signal strength of a third signal for the first cell to produce a third received signal strength value, measure a received signal strength of a fourth signal for the second cell to produce a fourth received signal strength value, form a second set of numeric values using the third and fourth received signal strength values, and
determine whether the first set of numeric values differs more than a certain predetermined amount from the second set of numeric values, wherein
the processor is further arranged such that, as a result of determining that the first set of numeric values differs more than the certain predetermined amount from the second numeric values, the processor employs a transmitter to send a displacement indication message to a displacement detection server, the displacement indication message indicating potential displacement of the wireless transceiver.

15. The host device according to claim 14, wherein the host device is the machine-to-machine device.

16. The host device according to claim 14, wherein the host device is a machine-to-machine gateway, the machine-to-machine gateway being distinct from the machine-to-machine device.

17. A method for detecting potential displacement of a wireless transceiver connected to a machine-to-machine device, the method comprising the steps, executed in a host device comprising the wireless transceiver, of:
measuring, by the host device, a received signal strength of a first signal for a first cell to produce a first received signal strength value;
measuring, by the host device, a received signal strength of a second signal for a second cell to produce a second received signal strength value;
forming a first set of numeric values using the first and second received signal strength values;
measuring, by the host device, a received signal strength of a third signal for the first cell to produce a third received signal strength value;
measuring, by the host device, a received signal strength of a fourth signal for the second cell to produce a fourth received signal strength value;
forming a second set of numeric values using the third and fourth received signal strength values;
determining, by the host device, whether the first set of numeric values differs more than a certain predetermined amount from the second set of numeric values; and
as a result of determining that the first set of numeric values differs more than the certain predetermined from the second set of numeric values, the host device sending a displacement indication message to a displacement detection server, the displacement indication message indicating potential displacement of the wireless transceiver.

18. The method according to claim 17, wherein the step of measuring comprises measuring radio characteristics of all radio cells available to the wireless transceiver.

19. The method according to claim 17, wherein the step of measuring comprises measuring signal strength of the radio cells.

20. The method according to claim 17, wherein the determining step comprises: calculating a first numeric value using said first set of numeric values, calculating a second numeric value using said second set of numeric values, and determining whether the first calculated numeric value differs more than said certain predetermined amount from the second calculated numeric value.

21. The method according to claim 17, wherein the step of determining involves the calculating a difference using root mean square.

22. The method according to claim 17, wherein the step of measuring updated radio characteristics involves measuring radio cells of at least two separate mobile communication networks operated by two separate mobile network operators.

23. The method of claim 17, wherein
generating the first numeric value using the first and second received signal strength values comprises calculating a numerical value using the first and second received signal strength values, and
determining whether the first numeric value differs more than the certain predetermined amount from the previously generated numeric value consists of determining whether the calculated numerical value differs more than the certain predetermined amount from a previously calculated numerical value.

24. A computer program product comprising a non-transitory computer readable medium storing a computer program for detecting potential displacement of a wireless transceiver connected to a machine-to-machine device, the computer program comprising computer program code which, when run on a host device, causes the host device to:
measure a received signal strength of a first signal for a first cell to produce a first received signal strength value;
measure a received signal strength of a second signal for a second cell to produce a second received signal strength value;
form a first set of numeric values using the first and second received signal strength values;
measure a received signal strength of a third signal for the first cell to produce a third received signal strength value;
measure a received signal strength of a fourth signal for the second cell to produce a fourth received signal strength value;
form a second set of numeric values using the third and fourth received signal strength values;
determine whether the first set of numeric values differs more than a certain predetermined amount from the second set of numeric values; and
as a result of determining that the first set of numeric values differs more than the certain predetermined amount from the second set of numeric values, send a displacement indication message to a displacement detection server, the displacement indication message indicating potential displacement of the wireless transceiver.

* * * * *